J. P. EASTMAN

May 23, 1933

HOSE CLAMP

Re. 18,840

2 Sheets-Sheet 1

Original Filed Dec. 12, 1927

Inventor:
Joseph Peter Eastman
By Young & Young
Attorneys:

J. P. EASTMAN

May 23, 1933. HOSE CLAMP Re. 18,840

2 Sheets-Sheet 2

Original Filed Dec. 12, 1927

Inventor:
Joseph Peter Eastman
By Young & Young
Attorneys.

Reissued May 23, 1933

Re. 18,840

UNITED STATES PATENT OFFICE

JOSEPH PETER EASTMAN, OF MANITOWOC, WISCONSIN

HOSE CLAMP

Original No. 1,808,101, dated June 2, 1931, Serial No. 239,459, filed December 12, 1927. Application for reissue filed August 9, 1932. Serial No. 628,212.

This invention relates to hose clamps.

Objects of this invention are to provide a novel form of hose clamp which is securely attached to the hose and prevents withdrawal thereof, which provides for the easy insertion of the hose, and which forces the end of the hose tightly against the wall of the clamp.

Further objects are to provide a hose clamp which is cheap to produce, which is easily and simply attached, and which has a neat and finished appearance.

Embodiments of the invention are shown in the accompanying drawings in which.

Figure 2:
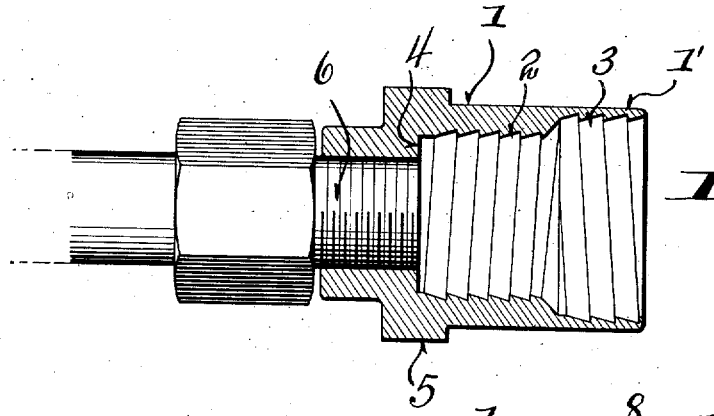
Figure 2 is a view partly in section of the hose clamp shown in Figure 1 before it is attached to the hose.

Figures 3, 4, 5, and 6, are views corresponding to Figure 2 showing further forms of the invention.

The hose clamp forming the subject matter of this invention is particularly adapted for cooperation with a hard hose or the like, such as a metal core hose, for instance.

Figure 1:
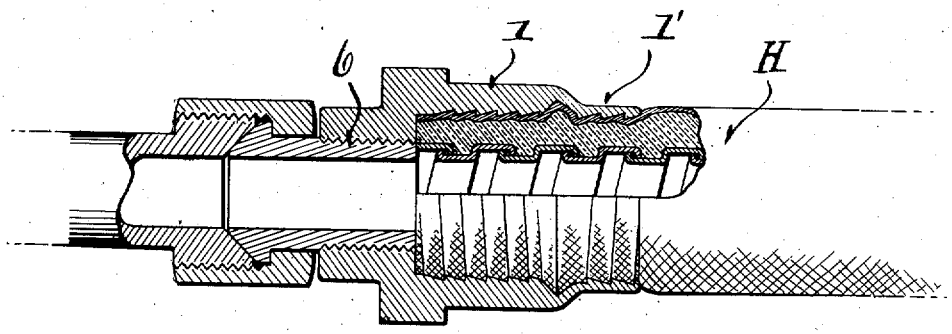
Figure 1 is a sectional view of one form of the device showing it as it appears attached to the hose.

Referring first to the form of the invention illustrated in Figures 1 and 2, it will be seen that the hose clamp is formed of a body portion 1 which is provided with two distinct bores, the inner bore being smaller than the outer bore. The inner bore is provided with threads 2, of a certain pitch and direction, and the outer bore is provided with threads 3 of a different pitch and direction. In the form shown in Figures 1 and 2, the threads 2 and 3 are formed reversely; for instance, the thread 2 may be a right hand thread, and the thread 3 may be a left hand thread. It it to be noted that by forming the outer bore considerably larger than the inner bore that a thin portion of the stock is left, as indicated by the reference character 1′.

Further, it is to be noted that the bore 2 ends at an abrupt wall or face 4 formed in the body portion. Preferably, the body portion is provided with an hexagonal or other shaped polygonal face 5, and if desired a tubular coupling stud 6 may be screwed into the outer end of the body portion.

In applying the device to the hard hose H, the hose is merely inserted up to the small bore and is screwed into place, thus tightly forcing the end of the hose against the wall 4, as shown in Figure 1. Thereafter, the thinned portion 1′ is contracted upon the hose, as shown in Figure 1, and the threads 3 thereof bite into the hose. Thus, the hose is securely threaded to the member 1 by means of right and left hand threads, and consequently the hose cannot be unscrewed.

It is to be distinctly understood that it is within the province of this invention to form both bores of the same diameter; that is to say, larger than the diameter of the hose and thereafter to contract the entire ferrule of the body portion. Preferably, however, the construction illustrated in the drawings is employed, as this permits the ready insertion of the hose and necessitates contraction of only the thinned portion of the body of the coupling.

It is to be noted particularly that the threads 2 and 3 are formed with a flat forward face and a tapered rear face so that in cross sections they are saw tooth shaped. This insures a very secure bite or grip upon the hose.

Figure 3:
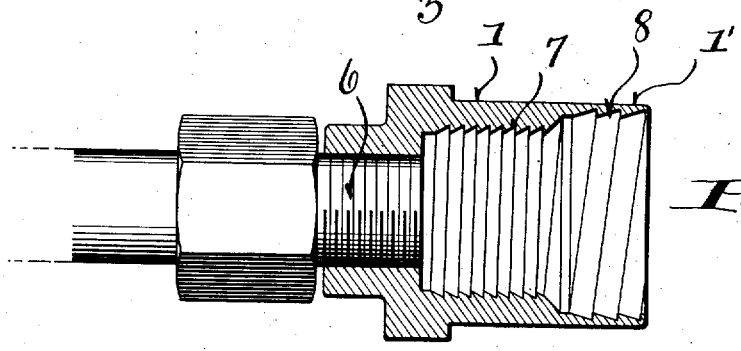

It is apparent that the threads in the small and large bore may be in the same direction but of different pitch and will thus prevent unscrewing of the hose. For example, as shown in Figure 3, the threads 7 are right hand threads of a fine pitch, and the threads 8 are also right hand threads but of a coarser pitch. Obviously, the pitch of the threads may be reversed, if desired.

It will be seen from reference to Figure 3, that when the thinned portion 1′ is contracted that the hose cannot be unscrewed as the threades are of different pitch.

Figure 4:
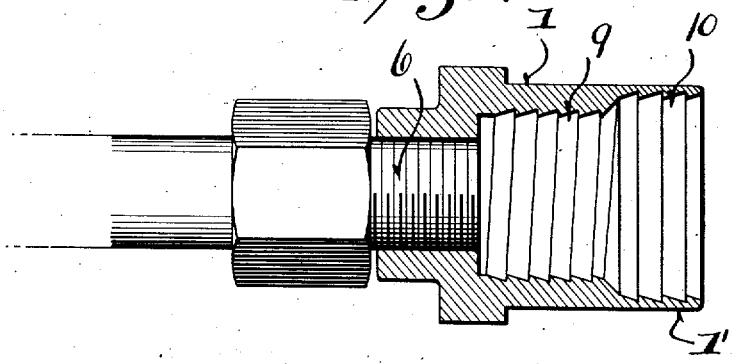

In the form shown in Figure 4, the small bore is provided with threads 9′ of a certain pitch and direction, whereas the large bore is provided with rings shaped like the threads but extending as distinct circles around the interior of the thinned portion.

Figure 5:
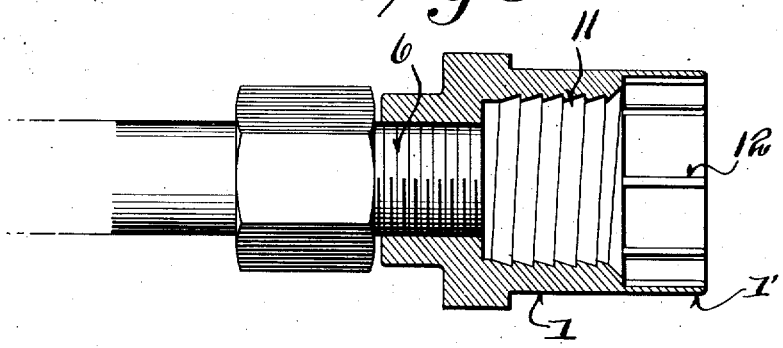

In the form shown in Figure 5, the small bore is provided with threads 11 and the thinned portion is provided with axially extending projecting ribs 12 which engage or bite into the hose when the device is contracted and thus prevent rotation thereof.

Figure 6:
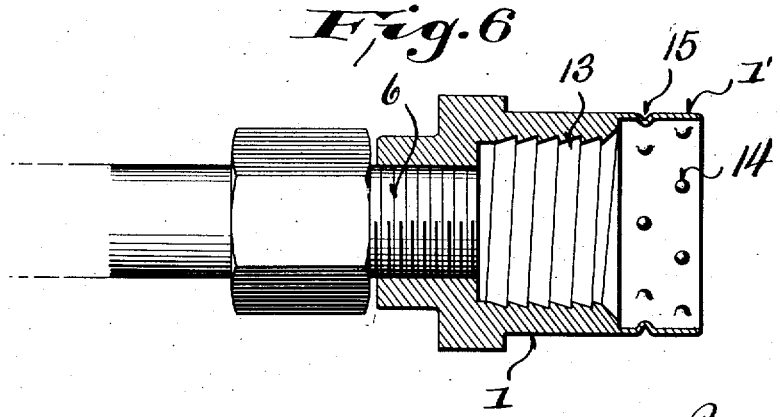

Referring to Figure 6, it will be seen that the small bore is provided with threads 13 whereas the large bore in the thinned portion is provided with projections 14. These projections may be formed by indentations 15 forced into the outer side of the thinned portion 1′ or they may be otherwise formed, as desired.

In all forms of the invention, it is apparent that the hose can be readily screwed into place and that in so doing, the end of the hose will be forced tightly into abutting engagement with the front wall of the clamp. After this, it is a simple matter to contract the thinned portion and thus cause intimate binding or engagement between the threads projections, rings, or other members formed in the thinned portion and the hose. The hose cannot, therefore, be unscrewed or pulled free of the device.

It will be noted further that the device is very simple in construction, may be easily produced, and readily attached to the hose, and that it forms a finished appearance.

Although the invention has been described in considerable detail, such description is intended as illustrative rather than limiting as the invention may be variously embodied and as the scope of such invention is to be determined as claimed.

I claim:

1. A hose clamp comprising a sleeve having a portion internally threaded with a right hand thread, and another portion internally threaded with a left hand thread, both of such portions being adapted to engage around the hose, and one of said portions being thinner than the remaining portion of the sleeve to provide for ready contraction on to the hose.

2. A hose clamp including a body having an annular wall, a sleeve projecting beyond said wall and having a portion thereof internally threaded with a right hand thread and another portion internally threaded with a left hand thread, both of said portions being adapted to engage around the hose.

3. A clamp having two co-axial portions of different internal diameters, the larger of said portions being adapted to be permanently contracted upon a hose after the insertion of the hose into both such portions, both of said portions having internal inwardly projecting hose engaging means, the means in one portion being of a different character from the means in the other portion.

4. A hose clamp comprising an end wall and a sleeve projecting therefrom adapted to receive the end of a hose, said sleeve comprising an inward portion and an outward portion, both such portions being bored with bores of substantially uniform diameter throughout the respective lengths of such portions, the bore of said outward portion being substantially greater than that of said inward portion at the time of insertion of the hose, said outward portion being adapted to be permanently contracted on to the hose, its bore, after such contraction, being reduced to substantially the same diameter as that of said first portion.

5. A hose clamp comprising a sleeve adapted to receive the end of a hose and to be contracted to grip the same, said sleeve having, before contraction, an inward portion of lesser, parallel bore and an outward portion of larger bore, the amount of the reduction in diameter after contraction being substantially greater in said outward portion than in said inward portion.

6. A hose clamp comprising a sleeve adapted to receive the end of a hose and to be contracted to grip the same, said sleeve, before contraction, being substantially parallel externally throughout its length, and having an inward portion of lesser bore and an outward portion of larger bore, and, after contraction, said sleeve being more contracted at said outward portion, whereby it is no longer substantially parallel externally throughout its length.

7. A hose clamp comprising a sleeve adapted to receive the end of a hose and to be contracted to grip the same, said sleeve having an inward portion with a thicker wall and an outward portion with a thinner wall, said two portions being of substantially equal external diameter before contraction, and of substantially equal internal diameter after contraction.

8. A hose clamp comprising a sleeve adapted to receive the end of a hose and to grip the same, said sleeve having, before contraction, an inward portion of lesser, parallel bore, and an outward portion of larger bore, such outward portion being adapted to admit the hose freely, before contraction, but gripping the hose after contraction, due to substantial reduction in diameter of said outward portion during contraction.

In testimony whereof, I affix my signature.

JOSEPH PETER EASTMAN.